Nov. 18, 1941.  P. F. ADAMS  2,262,909
TEMPERATURE SENSING DEVICE
Filed March 1, 1938   2 Sheets-Sheet 2
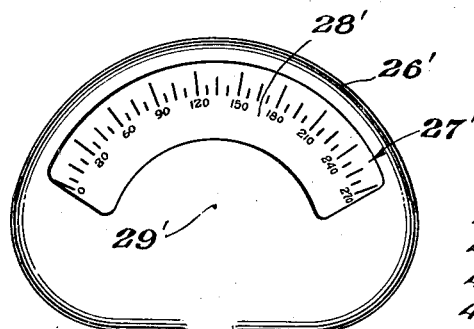
Fig. 6.
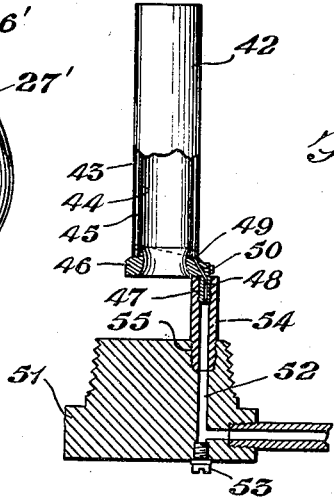
Fig. 7.
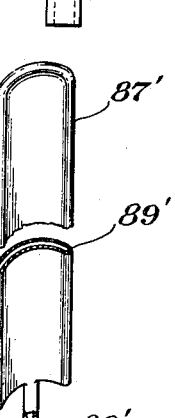
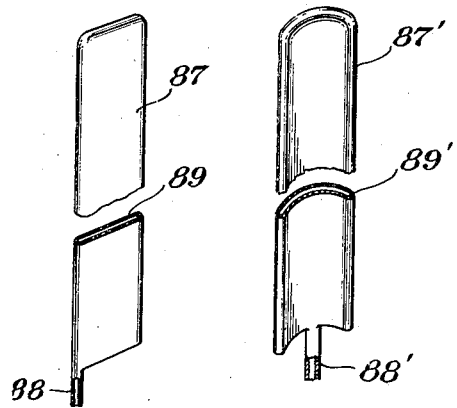
Fig. 9.   Fig. 10.
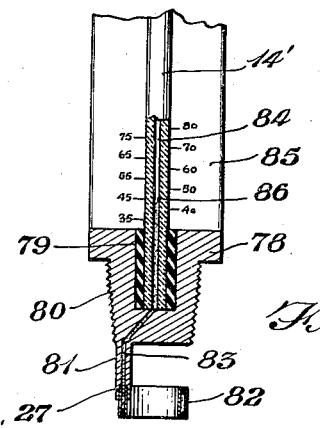
Fig. 8.
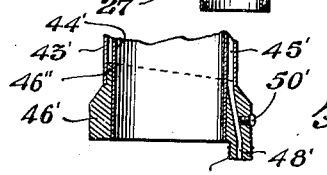
Fig. 11.
Inventor
PERRY F. ADAMS,
By A. Yates Dowell
Attorney Patented Nov. 18, 1941

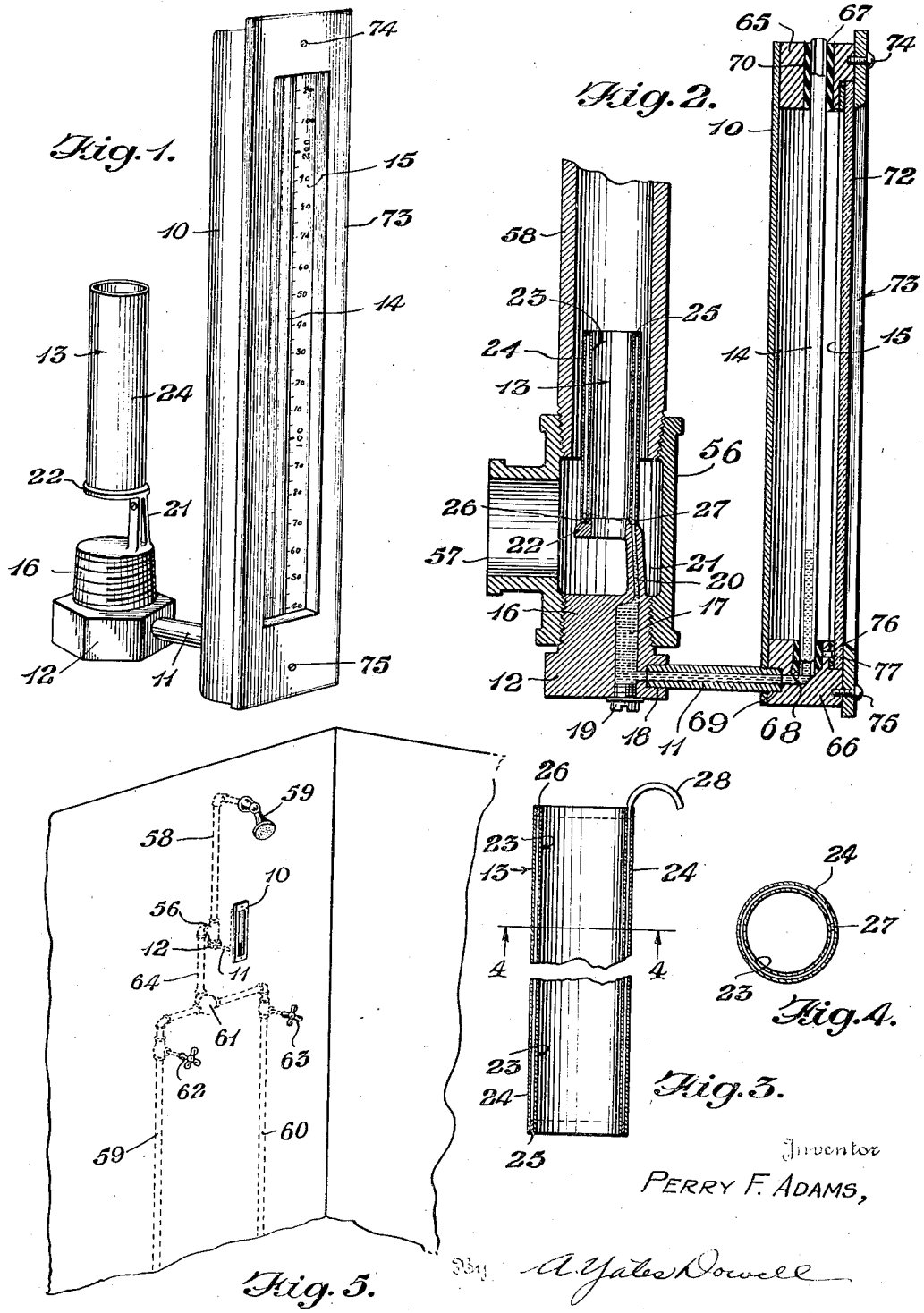

2,262,909

UNITED STATES PATENT OFFICE 2,262,909

TEMPERATURE SENSING DEVICE

Perry F. Adams, Cleveland, Ohio

Application March 1, 1938, Serial No. 193,343

2 Claims. (Cl. 73—369)

This invention relates to temperature sensing or detecting and more particularly to a new and useful thermal element of distinctly more delicate and sensitive nature, and one applicable to a very wide range of uses, as for example with a visible indicators for quickly and accurately determining temperature of matter of any nature.

Heretofore methods of obtaining temperature have been more or less inaccurate and time consuming, and the device used otherwise relatively crude, unreliable and expensive. For example, it is frequently desirable to know the temperature of the water used in taking a shower or tub bath not only as a matter of convenience or as a time saver but as a health protective or restorative measure. In determining temperature of bath water for pediatric use in a hospital, it has been customary to fill the tub or basin with water and immerse a mercury bulb thermometer encased in a block of wood and to allow the same to remain immersed for an indefinite period of time sufficient to allow for a supposedly true registration of the temperature, and then to add cold or hot water as desired for tempering with the process being repeated until the desired temperature is obtained. In a second case a thermostatically controlled valve may have been installed which permits the setting at any desired temperature and allows no water to flow until the desired temperature is reached. This latter method is not only expensive but very slow which is likewise true of the other ordinary methods in use at the present time.

In the various fields of use, temperature determining is not satisfactory for reasons similar to those heretofore enumerated. This invention is intended to be used in any industry or field for instantaneous temperature determination where a quick and accurate indication of temperature or change in temperature is desired.

It is vitally important that an aviator know constantly and accurately the temperature of the air strata through which he is flying as a warning of ice forming possibilities, likewise the temperature of the fuel in the carburetor, the motor and oil temperatures.

It is similarly important to know the temperatures of motors, bearings, exhaust gases or in any other fields where quick or instantaneous temperature indication is desired.

It is an object of this invention to provide a temperature sensing device which is simple and inexpensive, having accurate and substantially instantaneous action.

A further object of the invention is to provide a thermal element capable of being easily installed and one that may be used to replace thermal elements already in use to transform those prior slow operating, inaccurate devices into practical, instantaneously thermally responsive units.

Yet another object is to provide a thermal element responsive to temperature having a body of thermal fluid within relatively thin temperature conducting walls which confine the fluid into a thin film having a very large surface with respect to the volume of the fluid, in contact with the walls.

The foregoing and other objects and advantages of my invention will become apparent from the following description taken in conjunction with the accompanying drawings, wherein:

Fig. 1 is a perspective view in elevation of a temperature indicating unit or assembly embodying features of the present invention;

Fig. 2 is a substantially central vertical section of the unit shown in Fig. 1;

Fig. 3 is a sectional view of the thermal element embodying features of the invention;

Fig. 4 is a view taken on the line 4—4, Fig. 3;

Fig. 5 is a perspective view of a shower bath, illustrating one application of the improved temperature indicating unit or thermometer;

Fig. 6 is a front elevation parallel in section showing an indicating device with a thermal element incorporating features of the present invention, the whole providing an indicia system;

Fig. 7 is an elevation showing the thermal element attached to a specially designed fitting;

Fig. 8 is a front elevation partly in section of an indicating device incorporating a thermal element of the type herein contemplated;

Fig. 9 shows a variation in form of the thermal element, being substantially flat and elongated; and, Fig. 10 shows a further variation in the thermal element wherein the element is substantially arcuate in transverse section.

Fig. 11 shows a detail variation of the support construction of Fig. 2.

Considering the drawings in greater detail, Fig. 1 illustrates the incorporation of features of the present invention in a temperature indicia system utilizing a conventional thermometer indicator element indicated generally at 10 connected by a tube 11 to a fitting 12 upon which is mounted a thermal element 13. The thermometer indicator element comprises the usual frame structure supporting a glass tube 14, the interior of which latter is in communication with the tubular member 11, and positioned adjacent the tube 14 is the calibrated plate 15 bearing suitable indicia marks.

The fitting 12 has a tapering threaded boss portion 16 formed interiorly with a passage 17. The passage 17 is in communication with a threaded side port 18 into which the tube 11 is threadedly secured. The lower end of the passage 17 is closed by a plug 19 and the upper end is arranged to be in communication with the thermal element by means of a small bore 20 extending upwardly through the bracket legs 21, the upper end of the bracket is arranged in the form of a shouldered annulus 22 upon which is mounted the thermal element 13.

The thermal element 13 is preferably formed of substantially cylindrical contour although it will be readily understood that its configuration may partake of almost any arrangement which adapts itself to a particular field of use. For example, it may be oval, square, diamond shaped, corrugated or sinusoidal in transverse section. It will also be understood, as hereinafter more particularly pointed out, that other structural forms or shapes may be used.

The element 13 illustrating a preferred embodiment of features of the present invention comprises two concentric, narrowly spaced apart cylindrical walls 23 and 24 of relatively thin, heat conducting material, forming a passage with the ends closed at the bottom by means of an annulus 25 and at the top by split annulus 26. The space 27 between the opposed ends of the split annulus provide a means whereby a passage may be placed in communication with the interior of the thermal element. In Fig. 3 a flexible tube 28 is shown as connected to the passage 27.

The thermal element 13 in Figs. 1 and 2 is mounted upon the annular bracket 22 and secured thereupon by brazing, welding, etc., or by other means in such a way that the opening 27 is placed in communication with the bore 20.

The thermal element is preferably arranged with its wall spaced apart a very small distance so that a very thin film of thermal fluid can be housed within the walls. By such an arrangement a fluid medium may flow entirely about the walls of the thermal element by flowing in contact with the surfaces of the interior and exterior walls 23 and 24. A very thin film of thermal fluid within the element responds instantly to temperature conditions and provides an immediate and accurate indication of those conditions.

The thermally conductive material of which the walls of the thermal element are fabricated must be such as to provide the necessary strength and thickness for the particular use, to prevent the element from responding to pressure instead of temperature. Its specific gravity, density, mass, heat conductivity, coefficient of expansion, specific heat, and melting point, etc., must all be coordinated so that the element will efficiently fulfill the requirements of the present inventive concept. The spacing of the two walls, the particular thermal agent or agents used must all be coordinated with the previously mentioned physical properties of the material itself to likewise cooperate and give a resultant instantaneous operation in response to temperature conditions.

In Fig. 2 the thermal element is shown installed in a piping system through which a fluid is intended to flow for the purpose of the thermal element responding to the temperature conditions of the flowing fluid. The fitting 12 is shown secured in a standard T pipe fitting 56 having an inlet opening 57 and a pipe 58 going to the point at which the fluid is to be utilized. A typical example of this particular manner of using a device incorporating features of the invention is shown in Fig. 5 wherein hot and cold water supply pipes 59 and 60 respectively are arranged to supply water under the control of hand valves 62 and 63 to a mixing chamber 61. The water from the two sources after being mixed in the chamber 61 to form a resulting tempered body of water flows upwardly through the pipe 64 to the supply side 57 of the T 56 and thence upwardly through the pipe 58 to an appropriate spray device 59. The tubing connection 11 may preferably be of insulating material such as illustrated in Fig. 7, hereinafter described, for the purpose of making the device one which will give a more efficient instantaneous response to temperature conditions.

Considering certain further features of Fig. 2, it will be observed that the chamber or passage 17 is enlarged in cross section so as to serve as a reservoir for gauge liquid when the device utilizes a thermal fluid differing from the gauge liquid. If a gaseous or liquid medium is utilized as the thermal fluid with pressure type gauges, it is unnecessary to have a reservoir type of construction at this point. The gauge shown is constructed from a semi-tubular sheet metal shell 10 having the upper and lower ends closed by metal plugs 65 and 66, the former having a passage 67 through which the gauge glass 14 may extend, and the bottom plug having a passage 68 which is in communication with the threaded openings 69 into which the tubular member 11 is screwed. The gauge glass, as is common practice, has a bushing 70 placed about it to avoid breakage. The calibrated gauge plate 15 is positioned behind the protecting glass plate 72 which latter is secured to the front of the gauge by the steel frame 73 fastened at the top and bottom by screws 74 and 75. It will be readily understood that each gauge due to its conformance to standard specifications will be calibrated for all practical purposes at the time it leaves the factory. However, slight variations may occur and to allow the instrument to be adjusted in the field, the gauge plate 15 is adjustably secured in the gauge. This is accomplished by slotting the gauge plate at the lower end 76 and securing the same to the plug 66 by a set screw 77 which is countersunk so as to avoid any interference with the gauge glass itself.

In Fig. 6 features of the invention have been incorporated in a typical industrial thermometer construction of the so-called Bourdon type using a thermal fluid of either the gaseous or liquid type. In this arrangement, the meter 26′ comprises a metallic housing having an arcuately shaped open face 27′ behind which is mounted an appropriate scale plate 28′ calibrated for use in connection with the particular construction. The housing 26′ contains the Bourdon tube or other mechanical elements interiorly at the point 29′. The base of the housing is formed with an appropriate nipple member 30 threaded at its lower end 31 to which the thermal element is secured. The thermal element 32 in this instance comprises a cylindrical metallic sleeve having a cylindrical space 33 of very minute thickness. In other words, the thermally conducting walls of relatively thin material are spaced apart a distance comparable with the thickness of the wall material. The center of this element is hollow as indicated at 34 to allow fluid to flow all around the surfaces of the element. The upper end of the element is secured to a metal member 35 by means of brazing, silver soldering or any other appropriate method of securement which will maintain the thermal element 32 and the member 35 in fixed engagement. The lower end of plug 35 is arcuate as at 35' so as to direct fluid in a flow path through the interior of the element. The member 35 is internally threaded at 36 for threaded engagement with the nipple 30, and is exteriorly threaded at 37 for securement to a typical pipe connection 38 having a skirt 39 serving to protect the connection with the thermal element and being exteriorly threaded for connection with a supporting structure. The interior 33 of the thermal element is in communication with the Bourdon tube by means of the inner communicating passages 40 and 41 which latter is connected with the thermal element as in Fig. 3.

In Fig. 7 a detailed construction of the thermal element is shown incorporating novel features of the invention. The thermal element 42 in this instance includes concentric cylindrical heat conducting walls 43 and 44 appropriately closed at their opposite ends to define an intervening cylindrical space 45, the whole being mounted upon a shouldered annulus 46 having a depending threaded extension 47. This latter extension contains a bore hole 48 continuing upwardly through the annulus and being placed in communication with the interior of the thermal element at the point 49. For the purpose of filling the thermal element with any appropriate thermal fluid a small port is provided which is in communication with the bore hole 48 and which is closed by the screw plate 50. As soon as the appropriate amount of thermal fluid is placed within the system plug 50 is screwed home sealing the system so that it is ready for use.

A plug 51 is provided for mounting the thermal element in thermal relation with respect to a medium, the temperature of which is to be measured. This latter member contains a passage 52 which is closed at its lower end by a screw plug 53 and which is placed in communication with the thermal element by means of a hollow tubular connection 54 of thermal insulation which is threadedly engaged upon extension 47 at the top and threadedly secured to the plug at 55.

Fig. 8 illustrates a variation in application of features of the invention to thermometer elements wherein the element includes a body of liquid as the thermal agent. This may be for example applied to clinical thermometers with some slight detail variations. A plug type fitting 78 having a counter bore 79 is arranged with a tapering boss 80 threaded exteriorly. At the lower end of the boss is a bracket portion 81 at the lower end of which is secured a thermal element 82 constructed substantially in the same manner as those heretofore described. The port 27 of this element is secured to the plug fitting so that it is in communication with the passage 83 which latter extends into the base of the counterbore 79. A gauge tube 14' is secured in the counterbore with its passage 84 in communication with the passage 83. Adjacent the gauge glass is provided appropriate indicia marks 85 and the device is indicated with the body of liquid 86 filling the same.

Figs. 9 and 10 illustrate variations in the thermal element per se, Fig. 9 showing the element in the form of a flat elongated tube 87 having a connection 88 at the lower left hand corner. The walls of this element are spaced apart so as to provide an interior passage 89 which is of such dimension as to provide a very thin film of thermal agent which will react instantly to temperature conditions. Fig. 10 shows a somewhat similar element 87' which is arcuate in transverse cross section as shown at 89' having a connection 88' in the middle of one end wall. This element also provides a very thin film of thermal agent which responds instantly to temperature conditions.

It is possible to construct the thermal element so as to expedite its correct mounting upon the ring 22 as in Fig. 2 by making the internal cylinder 23 of greater length than the outer cylinder 24. This variation is shown in Fig. 11 wherein the inner cylinder 44' extends to the bottom of the ring 46' and its lower edge is flush with the ring and sealed thereto. In this manner the cylinder is positively aligned so that it will always be spaced from the walls of any passage in which it is located the proper distance. Another feature to insure accuracy in operation is to provide the ring 46' with an upstanding annular flange 46" which tapers in height so that any liquid getting into the thermal element due to a contraction of the thermal fluid can always quickly drain into the bore 48' as a result of the contour of the tapered flange. This tapering arrangement is also shown in Figs. 2 and 7. The outer cylinder is indicated at 43' seated outside of the flange and forming a space 45' between the two cylinders.

Although preferred embodiments of this invention have been illustrated and described, it will be understood that variations within the true spirit and scope of the same are intended to be covered by the appended claims.

What I claim is:

1. As an article of manufacture, a thermometer assembly for use in gauging temperatures of circulating or flowing liquids, comprising a gauge glass or tube, a frame supporting said glass and having a conduit therein in communication with said tube, a thermal unit consisting of telescoping tube sections having walls of thin material of high heat conducting properties with means at opposite ends of the sections maintaining them in sealed relation and spaced just sufficiently to provide a thin space therebetween for a thermal agent, a threaded plug to which said unit is connected, said plug being adapted for insertion in a pipe line with the unit projecting longitudinally of the line and whereby any liquid in the line is caused to flow both on the inside and outside of the tube sections, said plug being formed with a bore communication at one end with the thin space between said sections and at its opposite end with said conduit in said frame, the connection between said plug and said tube sections being formed of an elongated member having a relatively small cross section whereby heat transfer between said plug and said tube sections is reduced to a minimum.

2. Apparatus for measuring temperature of fluid flowing in a conduit comprising a pressure indicator, a temperature responsive bulb made up of telescoped tube sections having thin walls formed of material of high heat conductive properties and provided with means at their opposite ends maintaining the sections spaced and sealed, the space between the telescoped walls of the sections containing a thermal agent, a threaded plug to which said sections are connected by means of an elongated member of small cross section whereby said plug may be screwed in a suitable fitting in said conduit with the bulb extending into the conduit to permit fluid to flow both on the inside and outside of the telescoped sections, said plug and elongated member being formed with a bore communicating at one end with the thin space between said sections and means connecting the plug with the pressure indicator with the opposite end of the bore in communication with the pressure indicator.

PERRY F. ADAMS.